US012798347B2

(12) United States Patent
Neubauer

(10) Patent No.: US 12,798,347 B2
(45) Date of Patent: Nov. 17, 2026

(54) ELECTRIC AXLE WITH TWO-SPEED HIGH RATIO COAXIAL REDUCER AND SEPARATE HIGH SPEED REDUCER

(71) Applicant: Schaeffler Technologies AG & Co. KG, Herzogenaurach (DE)

(72) Inventor: Benedikt Neubauer, Herzogenaurach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 242 days.

(21) Appl. No.: 18/660,911

(22) Filed: May 10, 2024

(65) Prior Publication Data

US 2025/0346104 A1 Nov. 13, 2025

(51) Int. Cl.

*B60K 17/04* (2006.01)
*B60K 1/00* (2006.01)
*B60K 17/16* (2006.01)
*F16H 3/66* (2006.01)
*B60K 17/14* (2006.01)

(52) U.S. Cl.

CPC ................ *B60K 1/00* (2013.01); *B60K 17/16* (2013.01); *B60K 2001/001* (2013.01); *B60K 17/046* (2013.01); *B60K 17/14* (2013.01); *F16H 3/663* (2013.01); *F16H 3/666* (2013.01)

(58) Field of Classification Search

CPC .......... B60K 1/00; B60K 17/08; B60K 17/16; B60K 2001/001; B60K 17/00–22; B60K 17/046; F16H 3/66–666

See application file for complete search history.

(56) References Cited

U.S. PATENT DOCUMENTS 1,583,719 A 5/1926 Peter
3,473,412 A 10/1969 Bookout
3,473,413 A 10/1969 Stockton
4,040,312 A 8/1977 Tappan et al.
5,807,205 A 9/1998 Odaka et al.
8,419,579 B2 4/2013 Rosemeier et al.
8,708,857 B2 4/2014 Winter et al.
9,777,816 B2 10/2017 Petersen et al.
10,544,854 B2 1/2020 Schilder et al.
10,760,653 B2 9/2020 Schilder et al.
10,774,911 B2 9/2020 Yamamoto et al.
10,995,835 B2 5/2021 Engerman
11,067,152 B2 7/2021 Biermann (Continued)

FOREIGN PATENT DOCUMENTS

DE 102016011263 A1 6/2017
DE 102016002567 A1 9/2017

(Continued)

OTHER PUBLICATIONS

Woodgears.ca [online] 2014 [retrieved Dec. 3, 2024] Retrieved from the Internet: https://woodgears.ca/gear/ratio.html, 2014.

*Primary Examiner* — Tinh T Dang
(74) *Attorney, Agent, or Firm* — Volpe Koenig

(57) ABSTRACT

An electric beam axle includes an electric motor, a high-speed reducer, a shiftable reducer, and a differential. The shiftable reducer includes a planetary gearset and the differential at least one of a spur or bevel gear differential. The electric motor, high-speed reducer, shiftable reducer and rolling differential are aligned coaxially providing a radially compact electric beam axle.

9 Claims, 1 Drawing Sheet

(56) References Cited

U.S. PATENT DOCUMENTS

| | | | | |
|---|---|---|---|---|
| 11,235,660 | B2 | 2/2022 | Engerman | |
| 11,383,597 | B2 | 7/2022 | Kumar | |
| 11,679,670 | B2 | 6/2023 | Liu et al. | |
| 11,739,819 | B2 | 8/2023 | Uehara | |
| 11,892,066 | B2 | 2/2024 | Reisch et al. | |
| 12,508,892 | B2 | 12/2025 | Kaltenbach et al. | |
| 2003/0010547 | A1 | 1/2003 | Wachauer | |
| 2009/0111641 | A1 | 4/2009 | Kim | |
| 2009/0182474 | A1 | 7/2009 | Ross | |
| 2011/0287884 | A1 | 11/2011 | Unno et al. | |
| 2020/0096084 | A1 | 3/2020 | Engerman | |
| 2023/0037558 | A1* | 2/2023 | Wechs | B60K 6/365 |
| 2024/0225366 | A1 | 7/2024 | Chupka | |

FOREIGN PATENT DOCUMENTS

| | | | | |
|---|---|---|---|---|
| DE | 102017129594 | A1 * | 6/2019 | F16H 3/663 |
| DE | 102018101269 | A1 | 7/2019 | |
| DE | 102018111801 | A1 * | 11/2019 | F16H 3/663 |
| DE | 102018120446 | A1 | 2/2020 | |
| DE | 102019131764 | A1 | 5/2021 | |
| DE | 102022208157 | A1 | 2/2024 | |
| DE | 102022209071 | A1 | 2/2024 | |
| DE | 102022213187 | A1 | 6/2024 | |
| JP | 2002104001 | A | 4/2002 | |

* cited by examiner

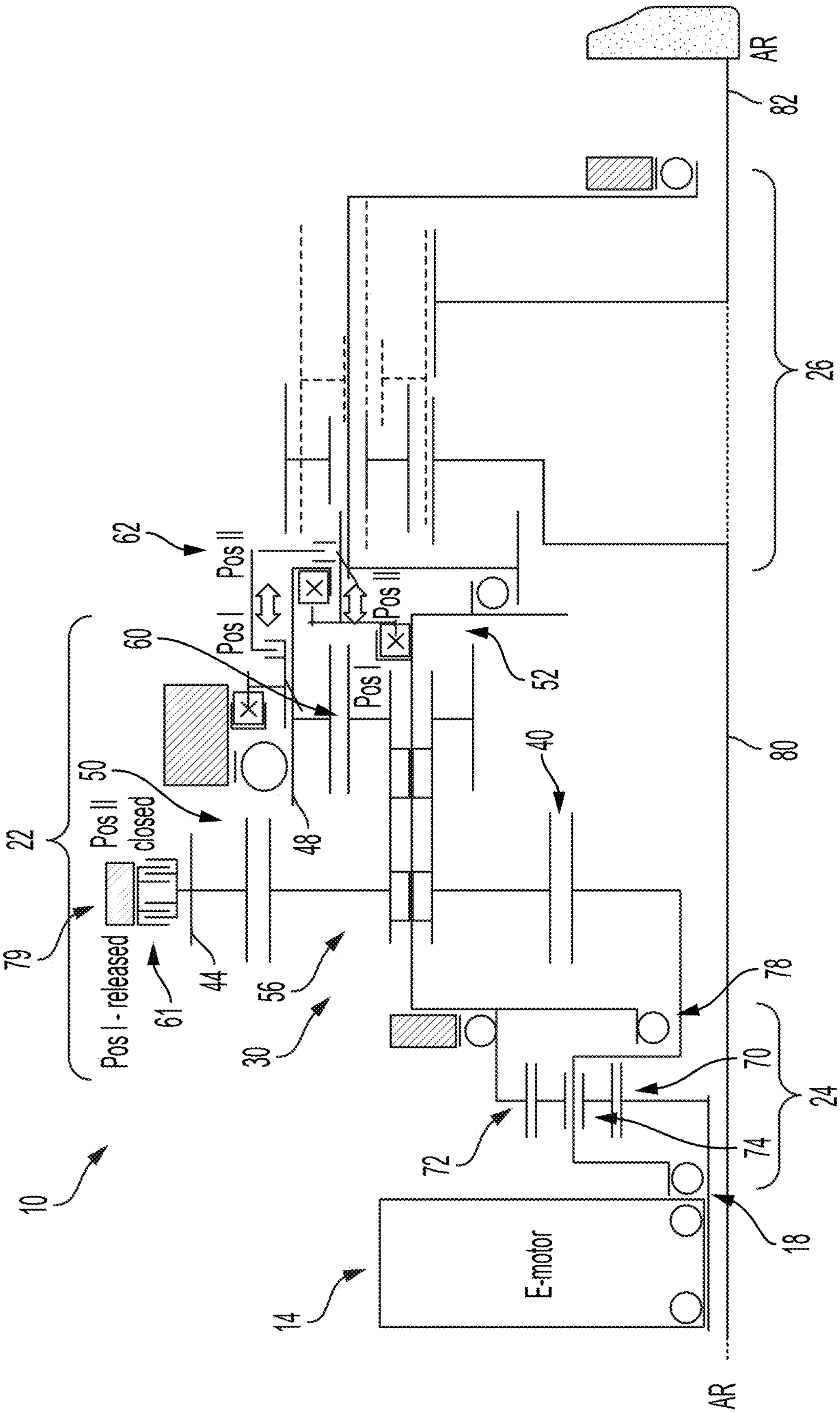
AR
82
26
62
Pos II
Pos I
Pos II
Pos I
60
52
40
80
50
Pos II
closed
22
79
Pos I - released
61
44
56
30
48
78
70
24
74
72
18
10
14
E-motor
AR

ELECTRIC AXLE WITH TWO-SPEED HIGH RATIO COAXIAL REDUCER AND SEPARATE HIGH SPEED REDUCER

FIELD OF INVENTION

The present disclosure related to a drivetrain for a vehicle. It is particularly concerned with a two-speed differential for an electric beam axle for an electric or hybrid vehicle.

BACKGROUND

Electric beam axles are used in hybrid and electric vehicles to transfer rotational energy from an electric motor to the wheels of the vehicle, causing the vehicle to propel in a specified direction. Electric beam axles include the electric motor and the gearing/gearbox required to transfer the rotational energy from the electric motor to the wheels of the vehicle. Based on design requirements, there is a limited space envelope in which the electric motor and the gearing/gearbox must be positioned within the electric beam axle. In addition, electric beam axles for truck applications often require high and low range gearing capabilities for normal and high torque driving conditions, respectively. Therefore, there is a need for an electric beam axle that can efficiently fit the electric motor and the gearing/gearbox for a hybrid and/or electric vehicle within a limited space envelope while maintaining full functionality and high and low range gearing capabilities.

SUMMARY

In one aspect, the present disclosure is directed to an electric beam axle for a hybrid or electric vehicle. The electric beam axle comprises an electric motor, a planetary ratio reducer coupled to the electric motor, a shiftable high ratio reducer driven by the planetary ratio reducer, and a differential driven by the shiftable high ratio reducer and connectable to a first vehicle wheel and a second vehicle wheel.

The electric motor, shiftable high ratio reducer, planetary ratio reducer and differential can be coaxially aligned. The shiftable reducer can include a compound planetary gearset having a plurality of stepped planet gears supported by a planet carrier. The compound planetary gearset can include a first ring gear and a second ring gear. Each stepped planet gear can include a large planet gear meshed to the first ring gear and a small planet gear meshed to the second ring gear, and the large planet gear and small planet gear rotate together and are connected to transfer torque. The compound planetary gearset of the shiftable high ratio reducer can include at least one clutch for selectively engaging the planet carrier with the differential in a first drive mode. The at least one clutch can selectively engage the second ring gear with the differential in a second drive mode. The planetary ratio reducer can include an input shaft coupled to the electric motor. The differential can include at least one of a spur gear differential or a bevel gear differential.

In accordance with another aspect, a gear train for an electric vehicle comprises a planetary ratio reducer having an input shaft for receiving rotational energy from an electric motor, a shiftable high ratio reducer driven by the planetary ratio reducer, and a differential driven by the shiftable high ratio reducer and connectable to a first vehicle wheel and a second vehicle wheel.

The shiftable high ratio reducer, planetary ratio reducer and differential can be coaxially aligned. The shiftable high ratio reducer can include a compound planetary gearset having a plurality of stepped planet gears supported by a planet carrier. The planetary gearset can include a first ring gear and a second ring gear. Each stepped planet gear includes a large planet gear meshed to the first ring gear and a small planet gear meshed to the second ring gear, and the large planet gear and small planet gear rotate together and are connected to transfer torque. The compound planetary gearset of the shiftable high ratio reducer can include at least one clutch for selectively engaging the planet carrier with the differential in a first drive mode. The at least one clutch can selectively engage the second ring gear with the differential in a second drive mode. The planetary reducer can include an input shaft. The differential can include at least one of a spur gear differential or a bevel gear differential.

BRIEF DESCRIPTION OF THE DRAWING(S)

The foregoing Summary as well as the following Detailed Description will be best understood when read in conjunction with the appended drawings, which illustrate a preferred embodiment according to the disclosure. In the drawings:

FIG. 1 is a schematic illustration of an exemplary electric beam axle for a hybrid and/or electric vehicle in accordance with the present disclosure.

DETAILED DESCRIPTION OF THE PREFERRED EMBODIMENT(S)

Certain terminology is used in the following description for convenience only and is not limiting. The words “front”, “rear”, “upper”, and “lower” designate directions in the drawings to which reference is made. The words “inwardly” and “outwardly” refer to directions towards and away from parts referenced in the drawings. “Axially” refers to a direction along the axis of a shaft. A reference to a list of items that are cited as “at least one of a, b, or c” (where a, b, and c represent the items being listed) means any single one of the items a, b, or c, or combinations thereof. The terms “generally” and “approximately” are to be construed as within 10% of a stated value or ratio. The terminology includes the words specifically noted above, derivatives thereof, and words of similar import.

FIG. 1 is a schematic illustration of an exemplary electric beam axle 10 for use in a hybrid and/or electric vehicle. FIG. 1 schematically illustrates only one half of a gearbox of the electric beam axle 10, but it is to be understood that at least some of the components and features of the gearbox are axially aligned with and surround an axis of rotation AR of the electric beam axle 10, discussed further below. In some examples, the axis of rotation AR can be an axis of rotation of wheels/tires coupled to the electric beam axle 10. Further, the electric beam axle 10 will hereinafter be referred to as the “axle 10”, but it is to be understood that the “electric beam axle 10” and the “axle 10” are used synonymously to refer to the same component/assembly.

The axle 10 is a beam axle for a hybrid and/or electric vehicle (i.e. a hybrid and/or electric automobile), and the axle 10 is configured to transfer rotational energy from an electric motor 14 to the wheels/tires of the vehicle (not shown). In some embodiments, the axle 10 can be a front axle of the hybrid and/or electric vehicle. In other examples, the axle 10 can be a rear axle of the hybrid and/or electric vehicle.

As shown in FIG. 1, the axle 10 includes the electric motor 14, an input shaft 18, a high-speed planetary ratio reducer 24, a shiftable high ratio reducer 22, and a differential 26. In some examples, the input shaft 18 can be a hollow shaft that is axially aligned with the axis of rotation AR of the axle 10.

The electric motor 14 can be an electric motor that converts electrical energy into mechanical energy, such as for example rotational energy that is provided to an output shaft of the electric motor 14. In some examples, the electric motor 14 can surround and be positioned concentric with the axis of rotation AR of the axle 10.

The input shaft 18 extends between and couples the electric motor 14 to the planetary ratio reducer 24. The planetary ratio reducer 24 includes a sun gear 70, a ring gear 72 and a plurality of planet gears 74 supported by a planet carrier 78. The carrier 78 of the planetary ratio reducer 24 is coupled to the shiftable high ratio reducer 22.

More specifically, the carrier 78 is coupled to the shiftable high ratio reducer 22 for transferring the rotational energy from the electric motor 14 to the shiftable high ratio reducer 22. The shiftable high ratio reducer 22 is aligned coaxially with the planetary ratio reducer 24. The shiftable high ratio reducer 22 includes a compound planetary gearset 30 that is shiftable between a first position I and a second position II, as described in more detail below. When position I is selected, the e-axle 10 delivers a normal drive ratio with high efficiency. When position II is selected, the e-axle 10 delivers a high torque drive ratio with best possible efficiency.

The planetary gearset 30 of the shiftable high ratio reducer 22 includes a sun gear 40 driven by the carrier 78 of the planetary ratio reducer 24, a first ring gear 44, a second ring gear 48, and a plurality of stepped planet gears 50 supported by a planet carrier 52. The ring gear 72 of the planetary ratio reducer 24 is coupled to the planet carrier 52 of the shiftable high ratio reducer 22. Each stepped planet gear 50 includes a large planet gear 56 interposed between the sun gear 40 and the first ring gear 44 and a small planet gear 60 coupled to the second ring gear 48 (e.g., the large planet gear 56 and the small planet gear 60 of each stepped planet gear 50 are rigidly coupled, for example, one solid part). A first clutch 61 is configured to selectively engage the first ring gear 44 (e.g., fix the first ring gear 44 against rotation) and a second clutch 62 is configured to selectively engage the second ring gear 48 (e.g., fix the second ring gear 48 against rotation).

An output of the shiftable high ratio reducer 22 is coupled to the differential 26. Axle half shafts 80 and 82 couple the differential 26 to the wheels/wheel hubs (not shown) of a vehicle. In some embodiments, the differential 26 can be a spur gear differential or a bevel gear differential, for example.

In the illustrated example, the planetary ratio reducer 24 is coaxially aligned with the shiftable high ratio reducer 22. In one example, the planetary ratio reducer 24 is positioned axially between the shiftable high ratio 22 reducer and the electric motor 14.

In operation, the shiftable high ratio reducer 22 is shiftable between a) position I with the second ring gear 48 coupled to differential 26 by clutch 62 (with clutch 61 engaged with first ring gear 44) for normal (high) range operations with a combined gear ratio of around i=19, for example, and b) position II with the planet carrier 52 coupled to the differential 26 by clutch 62 (with clutch 61 released) with a combined gear ratio of around i=50, for low-range operations. It will be appreciated that other gear ratios are possible.

The axle 10 of the present disclosure results in a simpler and more axially-compact gearing design that still includes the desired gear ratio ranges typical used by, for example, superduty trucks.

Having thus described the present embodiments in detail, it is to be appreciated and will be apparent to those skilled in the art that many physical changes, only a few of which are exemplified in the detailed description of the disclosure, could be made without altering the inventive concepts and principles embodied therein. It is also to be appreciated that numerous embodiments incorporating only part of the preferred embodiment are possible which do not alter, with respect to those parts, the inventive concepts and principles embodied therein.

The present embodiment and optional configurations are therefore to be considered in all respects as exemplary and/or illustrative and not restrictive, the scope of the disclosure being indicated by the appended claims rather than by the foregoing description, and all alternate embodiments and changes to this embodiment which come within the meaning and range of equivalency of said claims are therefore to be embraced therein.

LOG OF REFERENCE NUMERALS

10 Electric Beam Axle
14 Electric Motor
18 Input Shaft
22 Shiftable High Ratio Reducer
24 Planetary Ratio Reducer
26 Differential
30 Compound Planetary Gearset
40 Sun Gear
44 First Ring Gear
48 Second Ring Gear
50 Stepped Planet Gears
52 Planet Carrier
56 Large Planet Gear
60 Small Planet Gear
70 Sun Gear
72 Ring Gear
74 Planet Gears
78 Planet Carrier
80 Axle Shaft
82 Axle Shaft
AR Axis of Rotation

What is claimed is:

1. An electric beam axle for a hybrid or electric vehicle, the electric beam axle comprising:

an electric motor;

a planetary ratio reducer coupled to the electric motor;

a shiftable high ratio reducer driven by the planetary ratio reducer; and a differential driven by the shiftable high ratio reducer and connectable to a first vehicle wheel and a second vehicle wheel;

wherein the electric motor, shiftable high ratio reducer, planetary ratio reducer and differential are coaxially aligned;

wherein the shiftable reducer includes a compound planetary gearset having a plurality of stepped planet gears supported by a planet carrier;

wherein the compound planetary gearset includes a first ring gear and a second ring gear;

wherein each stepped planet gear includes a large planet gear meshed to the first ring gear and a small planet gear meshed to the second ring gear, and wherein the large planet gear and small planet gear rotate together and are connected to transfer torque; and wherein the compound planetary gearset of the shiftable high ratio reducer includes at least one clutch for selectively engaging the planet carrier with the differential in a first drive mode.

2. The electric beam axle of claim 1, wherein the at least one clutch selectively engages the second ring gear with the differential in a second drive mode.

3. The electric beam axle of claim 1, wherein the planetary ratio reducer includes a ring gear, and wherein the ring gear of the planetary ratio reducer is positioned axially between the electric motor and the large planet gears of the planetary gearset of the shiftable high ratio reducer.

4. The electric beam axle of claim 1, wherein the planetary ratio reducer includes an input shaft coupled to the electric motor.

5. The electric beam axle of claim 1, wherein the differential includes a spur gear differential.

6. A gear train for an electric vehicle comprising:

a planetary ratio reducer having an input shaft for receiving rotational energy from an electric motor;

a shiftable high ratio reducer driven by the planetary ratio reducer; and a differential driven by the shiftable high ratio reducer and connectable to a first vehicle wheel and a second vehicle wheel;

wherein the shiftable high ratio reducer, planetary ratio reducer and differential are coaxially aligned;

wherein the shiftable high ratio reducer includes a compound planetary gearset having a plurality of stepped planet gears supported by a planet carrier;

wherein the compound planetary gearset includes a first ring gear and a second ring gear;

wherein each stepped planet gear includes a large planet gear meshed to the first ring gear and a small planet gear meshed to the second ring gear, and wherein the large planet gear and small planet gear rotate together and are connected to transfer torque; and wherein the compound planetary gearset of the shiftable high ratio reducer includes at least one clutch for selectively engaging the planet carrier with the differential in a first drive mode.

7. The gear train of claim 6, wherein the at least one clutch selectively engages the second ring gear with the differential in a second drive mode.

8. The gear train of claim 6, wherein the planetary ratio reducer includes an input shaft.

9. The gear train of claim 6, wherein the differential includes spur gear differential.

* * * * *